United States Patent
Kist et al.

(10) Patent No.: US 6,801,897 B2
(45) Date of Patent: Oct. 5, 2004

(54) METHOD OF PROVIDING CONCISE FORMS OF NATURAL COMMANDS

(75) Inventors: Thomas A. Kist, Boynton Beach, FL (US); James R. Lewis, Delray Beach, FL (US)

(73) Assignee: International Business Machines Corporation, Armonk, NY (US)

(*) Notice: Subject to any disclaimer, the term of this patent is extended or adjusted under 35 U.S.C. 154(b) by 518 days.

(21) Appl. No.: 09/819,783

(22) Filed: Mar. 28, 2001

(65) Prior Publication Data

US 2002/0143535 A1 Oct. 3, 2002

(51) Int. Cl.[7] .......................... G10L 15/22; G10L 15/18; G06F 17/20
(52) U.S. Cl. .................. 704/275; 704/270; 704/257
(58) Field of Search ................. 704/204, 257, 704/275, 236, 270

(56) References Cited

U.S. PATENT DOCUMENTS

| | | | | |
|---|---|---|---|---|
| 4,882,757 A | * | 11/1989 | Fisher et al. | 704/253 |
| 5,983,190 A | * | 11/1999 | Trower et al. | 704/276 |
| 6,023,760 A | * | 2/2000 | Karttunen | 712/300 |
| 6,085,159 A | * | 7/2000 | Ortega et al. | 704/235 |
| 6,138,098 A | * | 10/2000 | Shieber et al. | 704/257 |
| 6,182,046 B1 | * | 1/2001 | Ortega et al. | 704/275 |
| 6,208,971 B1 | * | 3/2001 | Bellegarda et al. | 704/275 |
| 6,275,792 B1 | * | 8/2001 | Lewis | 704/9 |
| 6,591,236 B2 | * | 7/2003 | Lewis et al. | 704/251 |

* cited by examiner

*Primary Examiner*—Doris H. To
*Assistant Examiner*—James S. Wozniak
(74) *Attorney, Agent, or Firm*—Akerman Senterfitt

(57) ABSTRACT

In a speech recognition system, a method of providing a concise form of a natural command can include receiving a user specified command and identifying all functionally equivalent natural command forms of the user specified command from a natural command grammar. The length of each functionally equivalent natural command form can be determined. The method also can include presenting a selected one of the functionally equivalent natural command forms having the shortest length to the user.

13 Claims, 3 Drawing Sheets

METHOD OF PROVIDING CONCISE FORMS
OF NATURAL COMMANDS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition, and more particularly, to presenting concise speech command forms to a user.

2. Description of the Related Art

Speech recognition is the process by which an acoustic signal received by a transducive element is converted to a set of text words, numbers, or symbols by a computer. These recognized words may then be used in a variety of computer program applications for purposes such as document preparation, data entry, and command and control. Improvements to speech recognition systems provide an important way to enhance user productivity.

For example, users can control various aspects of a voice enabled system through the use of natural commands. Natural commands are spoken phrases mirroring natural human speech which can be translated into a command that is recognizable by a computer program. Voice enabled systems typically provide users with several alternative natural commands for initiating a single function. Such functionally equivalent natural commands offer users a variety of differing phrases for accomplishing the same task, thereby allowing a user to select a phrase which is preferred by that user.

Conventional speech recognition systems can use a natural command grammar to specify a list of acceptable phrases for initiating a particular function. The natural command grammar can be specified as a word list which later must be processed to translate portions of the grammar into a command which can be recognized by a voice enabled computer program. Another type of grammar can be an annotated grammar which also must be processed to determine a recognizable command. An annotated grammar, however, can contain annotations to aid in the translation processing. Still, the natural command grammar can be a Backus-Naur Form (BNF) grammar already containing specified translation rules. Thus, any natural command which can be used to access a command within a voice enabled computer program must be specified within the natural command grammar.

Oftentimes, a user can be unaware of the particular natural command form for performing a given function in the voice enabled computer program. In such cases, rather than consulting a manual, the user typically utters a series of different possible command permutations until the speech recognition system recognizes a natural command form and initiates the user desired function. The natural command form stumbled upon by the user, however, is not always the most concise manner of expressing that particular natural command. Over time, as a user continues to use a particular voice enabled system, the user likely will want to become more efficient at using the system without having to read or memorize portions of a user's manual.

SUMMARY OF THE INVENTION

The invention disclosed herein concerns a method for providing concise forms of natural commands in a voice enabled system. In particular, the invention can receive a user specified command and present the user with one or more different, but functionally equivalent, natural command forms. A natural command grammar can be accessed and processed to identify each functional equivalent natural command form of the user specified command. Notably, functional equivalents of the user specified command can include any natural command in the natural command grammar, which when translated, produces the same command which is recognizable by the voice enabled system. Once the functional equivalents are identified, the lengths of each functional equivalent can be determined. The shortest or most concise functional equivalent or equivalents can be provided to the user for future reference.

One aspect of the present invention can include a method of providing a concise form of a natural command in a speech recognition system. The method can include receiving a user specified command and identifying all functionally equivalent natural command forms of the user specified command from a natural command grammar. The length of each functionally equivalent natural command form can be determined. The method further can include presenting a selected one of the functionally equivalent natural command forms having the shortest length to the user.

If a plurality of functionally equivalent natural command forms each have the shortest and equivalent length, the presenting step can include presenting a selected plurality of functionally equivalent natural command forms to the user. Alternatively, a selected one from a plurality of functionally equivalent natural command forms can be presented to the user. In any case, if the user specified command is a natural command, the functionally equivalent natural command forms can include the received user specified natural command form.

Another embodiment of the invention can include a method of providing a concise form of a natural command in a speech recognition system. The method can include receiving a user specified command and identifying all functionally equivalent natural command forms of the user specified command from a natural command grammar. The length of each functionally equivalent natural command form can be determined. Finally, the method can include presenting a selected at least one of the functionally equivalent natural command forms having the shortest length to the user.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method for providing concise forms of natural commands in a voice enabled system. In particular, the invention can determine one or more concise natural command forms which can be functionally equivalent to a user specified command.

Notably, the user specified command need not be a speech command. Rather, the user specified command can be initiated by any means such as a keyboard or a pointer. Thus, the invention can identify the most concise or shortest natural command form or forms corresponding to a received command as specified in a natural command grammar regardless of the means used to initiate the received command.

The natural command grammar can specify all natural command forms which can be accepted by the speech recognition system. Accordingly, each natural command form which is an acceptable functional equivalent of the user specified command is also specified within the natural command grammar. A functional equivalent of the user specified command can include any natural command in the natural command grammar, which when translated, produces the same command which can be recognize by a voice enabled computer program (hereafter referred to as "program recognizable commands"). Examples of functional equivalents can include any other natural commands which when translated produce the program recognizable command "topfile". For instance, in the case of a voice enabled text processor, the natural command form "go to the top of the document" can be translated into the command "topfile" which causes the text processor to display the beginning of a document.

It should be appreciated that the program recognizable commands can be specified by a voice enabled computer program and can be published such that the voice enabled computer program can interact with a speech recognition system. Moreover, each voice enabled computer program can utilize an independent set of translation rules for correlating natural command forms to program recognizable commands. Notably, once the functional equivalent natural command forms have been identified, the lengths of each functional equivalent natural command form can be determined. The shortest functional equivalent or equivalents can be provided to the user for future reference.

Figure 1:
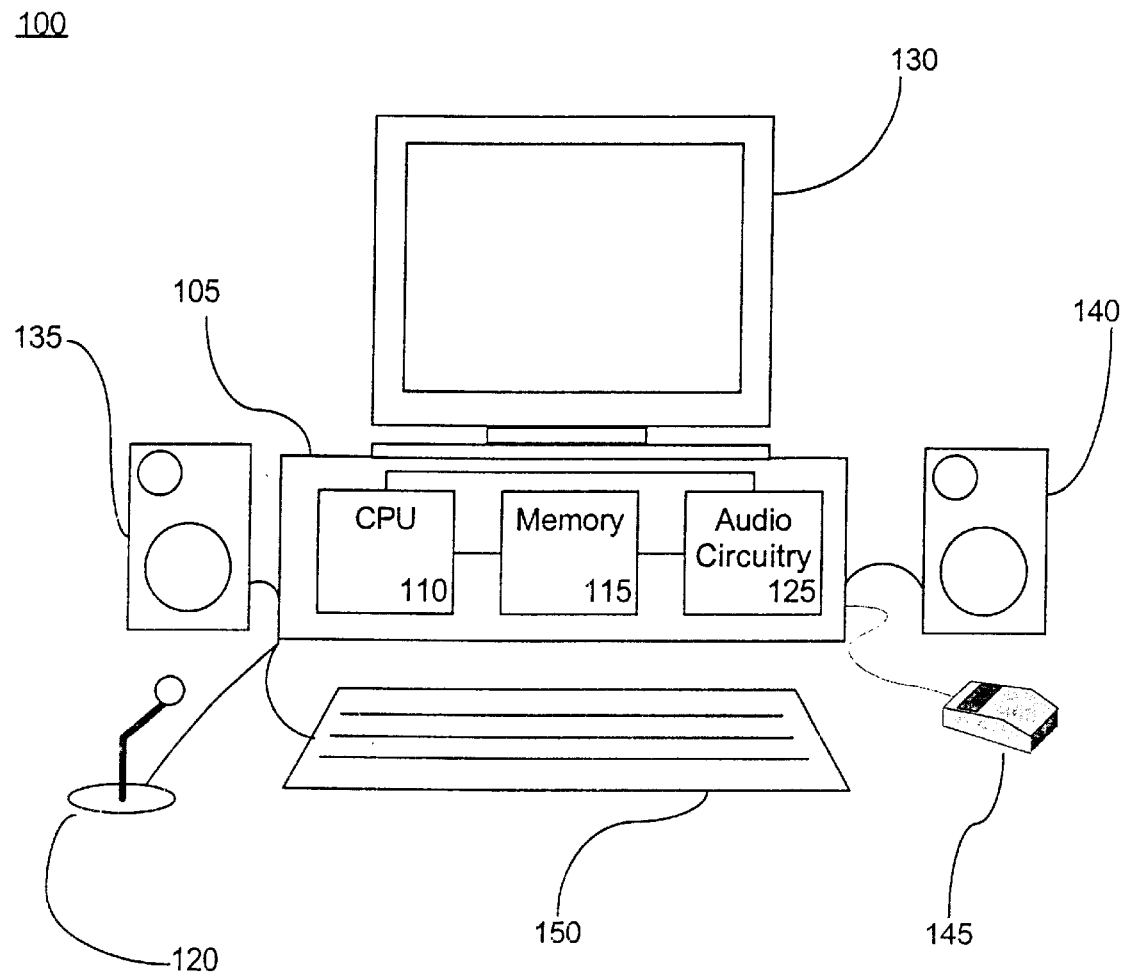
FIG. 1 is a schematic diagram of an exemplary computer system on which the invention can be used.

FIG. 1 depicts a typical computer system 100 for use in conjunction with the present invention. The system can include a computer 105 including a central processing unit 110 (CPU), one or more memory devices 115, and associated circuitry. The memory devices 115 can be comprised of an electronic random access memory and a bulk data storage medium. The system also can include a microphone 120 operatively connected to the computer system through suitable interface circuitry 125, and an optional user interface display unit 130 such as a video data terminal operatively connected thereto. The CPU can be comprised of any suitable microprocessor or other electronic processing unit, as is well known to those skilled in the art. Speakers 135 and 140, as well as an interface device, such as mouse 145, and keyboard 150, can be provided with the system, but are not necessary for operation of the invention as described herein. The various hardware requirements for the computer system as described herein can generally be satisfied by any one of many commercially available high speed computers.

Figure 2:
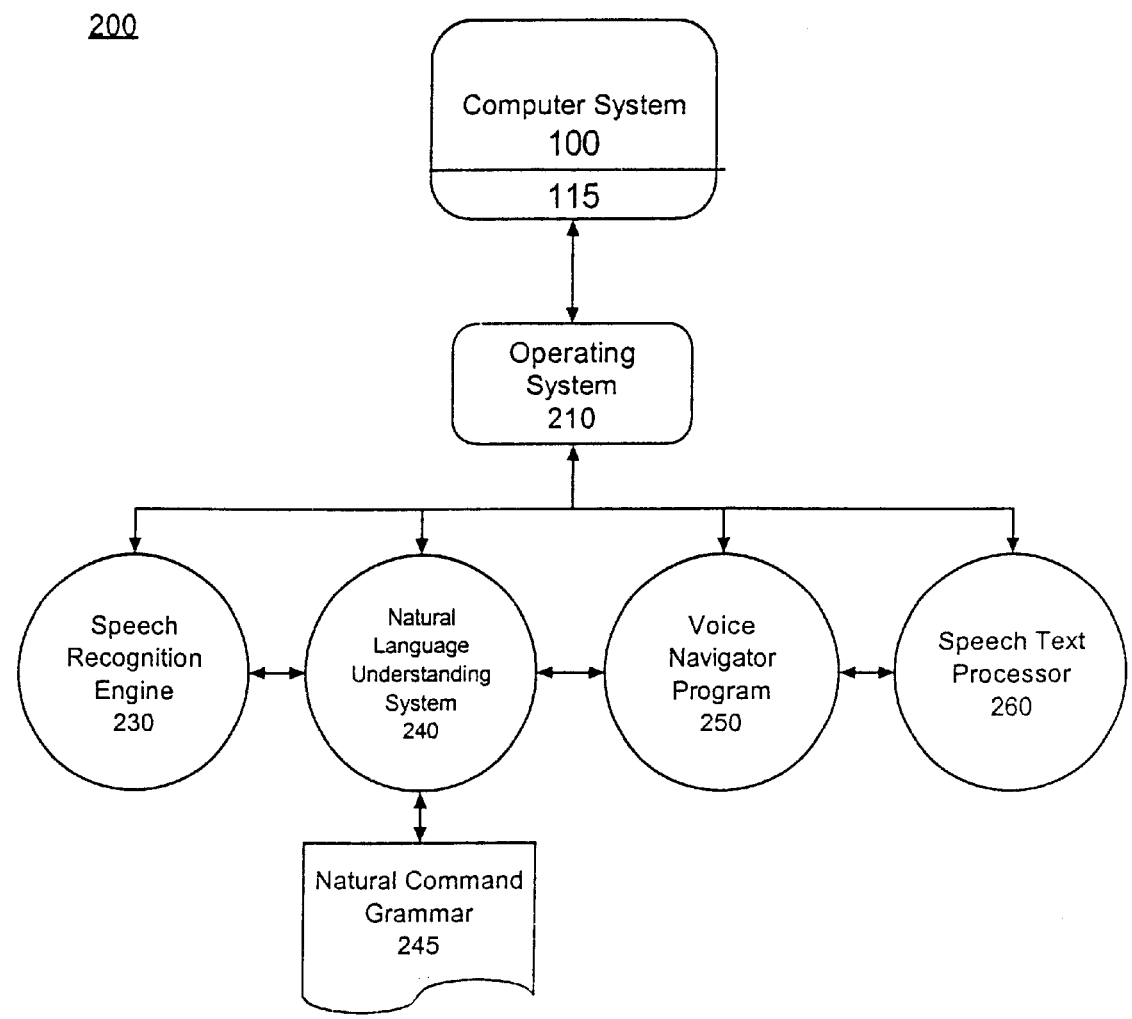
FIG. 2 is a schematic diagram depicting an exemplary architecture for speech recognition.

FIG. 2 is a schematic diagram 200 illustrating a typical architecture for a speech recognition system in computer 100. As shown in FIG. 2, within the memory 115 of computer system 100 can be an operating system 210 and a speech recognition engine 230. Also included can be a natural language understanding (NLU) system 240, a voice navigator program 250, and a speech text processor 260. The invention, however, is not limited in this regard and the speech recognition engine 230 can be used with any other application program which is to be voice enabled. In FIG. 2, the speech recognition engine 230, the NLU system 240, the voice navigator program 250, and the speech text processor 260 are shown as separate application programs. It should be noted however that the invention is not limited in this regard, and these various application programs can be implemented as a single, more complex application program. For example the speech recognition engine 230 can be combined with the NLU system 240 or speech text processor 260 or with any other program to be used in conjunction with the speech recognition engine 230. Also, if no other speech controlled application programs are to be operated in conjunction with the speech text processor 260 and speech recognition engine 230, the system can be modified to operate without the voice navigator program 250. The voice navigator program 250 primarily helps coordinate the operation of the speech recognition engine 230.

The NLU system 240 enables a computer to understand and extract information from human written or spoken language. The NLU system 240 can function in a complimentary manner with the speech recognition engine 230 where there exists a need to understand human language such as in the case of command and control.

NLU systems can extract relevant information contained within text and then supply this information to another computer program or system. NLU system 240 can include a natural command grammar 245 which can specify the complete list of acceptable natural language phrases corresponding to program recognizable commands. As previously mentioned, the natural command grammar can be a Backus-Naur Form grammar containing translation rules, a list of acceptable phrases which can be parsed at a later time to determine translation rules, or an annotated grammar wherein the annotations can aid a parser in determining the translation rules.

The aforementioned components can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Application program or computer program in the present context means any expression, in any language, code or notation, of a set of instructions intended to cause a system having an information processing capability to perform a particular function either directly or after either or both of the following a) conversion to another language, code, or notation; b) reproduction in a different material form.

In operation, audio signals representative of sound received in microphone 120 can be processed within computer 100 using conventional computer audio circuitry so as to be made available to the operating system 210 in digitized form. Alternatively, audio signals can be received via a computer communications network from another computer system in analog or digital format, or from another transducive device such as a telephone. The audio signals received by the computer system 100 are conventionally provided to the speech recognition engine 230 via the computer operating system 210 in order to perform speech recognition functions. As in conventional speech recognition systems, the audio signals can be processed by the speech recognition engine 230 to identify words spoken by a user into microphone 120. The NLU system 240 can analyze text representing user spoken utterances provided by the speech recognition system 230 to determine whether the text corresponds to a natural command within the natural command grammar 245. The voice navigation program 250 can coordinate the operation of the speech recognition engine 230, the NLU system 240, and the speech text processor 260 through the operating system 210.

Figure 3:
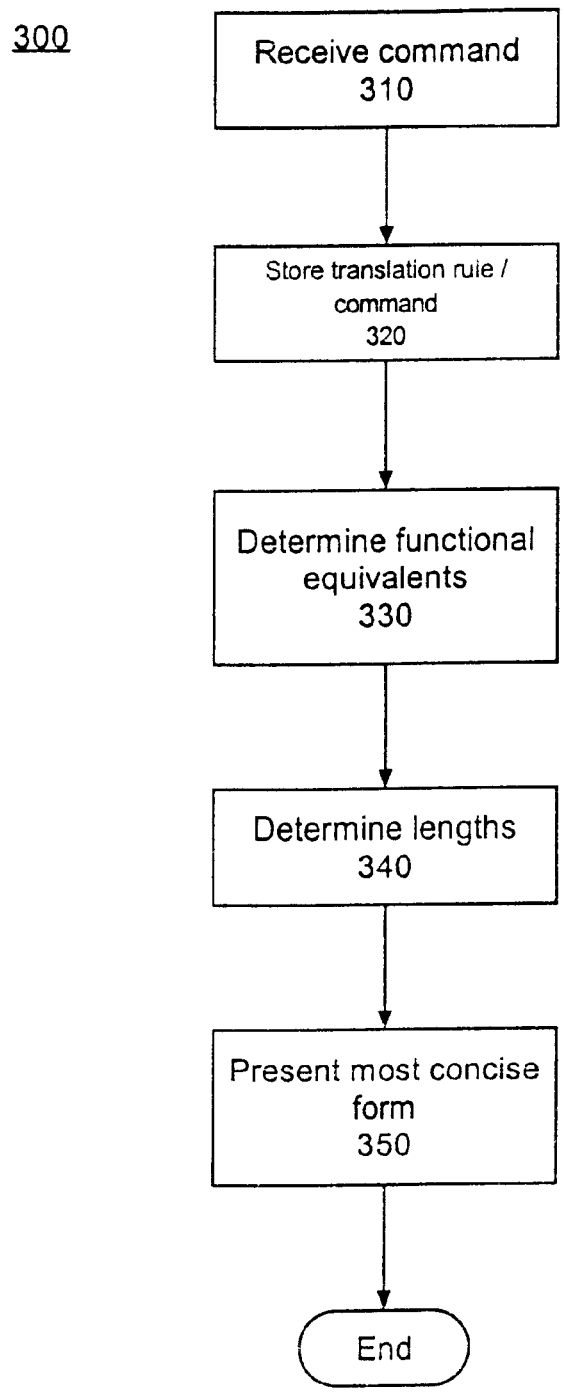
FIG. 3 is a flow chart illustrating an exemplary method of providing concise forms of natural commands.

FIG. 3 is a flow chart illustrating an exemplary method for providing concise forms of natural commands in a voice enabled system as performed by the exemplary speech recognition system of FIG. 2. The exemplary method can begin in a state where the speech recognition system is active and awaiting a user command. Notably, the user command can be a speech command, a keyboard command, a pointer command such as a mouse, touch-pad, or a stylus originated command. Regardless, of the type of command received, the invention can determine a concise functionally equivalent natural command form for the received user specified command. At step 310, a user specified command can be received.

In step 320, a translation rule can be determined for the received user specified command. If the user specified command is not a voice command, the translation of the natural command form to a program recognizable command need not be performed. Rather, the program recognizable command merely can be stored. If the user specified command is a speech command or a natural command, however, the natural command grammar can be consulted to determine the proper translation rule for the speech command. Using the translation rule, the corresponding program recognizable command can be determined. Subsequently, either the program recognizable command, or the translation rule if one is determined, or both can be stored.

Importantly, in one aspect of the invention, the program recognizable command and translation rule can be included within the natural command grammar. Alternatively, however, in a second aspect of the invention, such information can be excluded from the natural command grammar. As a result, additional parsing and processing of the grammar can be required to produce a translation rule and program recognizable command. After completion of step 320, the method can continue to step 330.

In step 330, the natural command grammar can be processed to determine functionally equivalent natural command forms for the received user specified command. In particular, the speech recognition system can process the grammar to determine each natural command phrase which yields the stored translation rule, or alternatively, the actual program recognizable command. Notably, the amount of processing can vary depending upon whether the grammar contains translation rules and program recognizable commands or additional programming must be included to parse the grammar and determine translation rules and program recognizable commands. After completion of step 330, the method can proceed to step 340.

In step 340, the length of each identified functionally equivalent natural command form can be determined. The length of a natural command form can be specified in a variety of formats, including, but not limited to, the number of characters, syllables, or words comprising the natural command form. After completion of step 340, the method can continue to step 350. In step 350, the most concise functionally equivalent natural command form can be selected for presentation to a user. Accordingly, the functionally equivalent natural command form having the shortest length, as determined by one of the aforementioned length measures, can be selected. If more than one functionally equivalent natural command form is identified as having the shortest length, wherein the lengths of the natural command forms are equivalent, the user can be presented with each one of the natural command forms.

In an alternative aspect of the invention, one of the plurality of functionally equivalent natural command forms can be presented. In that case, additional criteria can be utilized to select the single functionally equivalent natural command. For example, the most concise functionally equivalent natural command that most resembles the received natural command can be selected. This determination can be made through a comparison of the characters or syllables of the received user specified natural command and the plurality of functionally equivalent and most concise natural commands.

It should be appreciated that the method of the invention disclosed herein can be performed automatically or in response to a user request. For example, the user can access the invention through a designated command, whether a speech command or a non-speech command. In an alternative embodiment, the invention can automatically present a user with functional equivalents. In that case, the functional equivalents can be displayed in a portion of a graphical user interface (GUI) such as a status window, text box, status bar, or any other portion of a GUI. Still, the functional equivalents can be presented as audio using an audio playback system or text-to-speech technology.

What is claimed is:

1. In a speech recognition system, a method of providing a concise form of a natural command, said method comprising:

receiving a user specified command;

identifying all functionally equivalent natural command forms of said user specified command from a natural command grammar;

determining a length of each said functionally equivalent natural command form; and presenting a selected one of said functionally equivalent natural command forms having the shortest length to said user.

2. The method of claim 1, said presenting step comprising:

presenting a selected plurality of functionally equivalent natural command forms to said user, each one of said selected plurality of functionally equivalent natural command forms having a shortest and equivalent length.

3. The method of claim 1, said presenting step comprising:

presenting a selected one from a plurality of functionally equivalent natural command forms to said user, each one of said plurality of functionally equivalent natural command forms having a shortest and equivalent length.

4. The method of claim 1, wherein if said user specified command is a natural command, said functionally equivalent natural command forms include said received user specified natural command form.

5. The method of claim 1, said identifying step further comprising:

determining the program recognizable command associated with the user specified command; and identifying all natural command forms associated with the program recognizable command.

6. A In a speech recognition system, a method of providing a concise form of a natural command, said method comprising:

receiving a user specified command;

identifying all functionally equivalent natural command forms of said user specified command from a natural command grammar;

determining a length of each said functionally equivalent natural command form; and presenting a selected at least one of said functionally equivalent natural command forms having the shortest length to said user.

7. The method of claim 6, said identifying step further comprising:

determining the program recognizable command associated with the user specified command; and identifying all natural command forms associated with the program recognizable command.

8. A machine readable storage, having stored thereon a computer program having a plurality of code sections executable by a machine for causing the machine to perform the steps of;

receiving a user specified command;

identifying all functionally equivalent natural command forms of said user specified command from a natural command grammar;

determining a length of each said functionally equivalent natural command form; and presenting a selected one of said functionally equivalent natural command forms having the shortest length to said user.

9. The machine readable storage of claim 8, said presenting step comprising:

presenting a selected plurality of functionally equivalent natural command forms to said user, each one of said selected plurality of functionally equivalent natural command forms having a shortest and equivalent length.

10. The machine readable storage of claim 8, said presenting step comprising:

presenting a selected one from a plurality of functionally equivalent natural command forms to said user, each one of said plurality of functionally equivalent natural command forms having a shortest and equivalent length.

11. The machine readable storage of claim 8, wherein if said user specified command is a natural command, said functionally equivalent natural command forms include said received user specified natural command form.

12. The machine readable storage of claim 8, said identifying step thither comprising:

determining the program recognizable command associated with the user specified command; and identifying all natural command forms associated with the program recognizable command.

13. A machine readable storage, having stored thereon a computer program having a plurality of code sections executable by a machine for causing the machine to perform the steps of:

receiving a user specified command;

identifying all functionally equivalent natural command forms of said user specified command from a natural command grammar;

determining a length of each said functionally equivalent natural command form; and presenting a selected at least one of said functionally equivalent natural command forms having the shortest length to said user.

* * * * *